Aug. 11, 1970 H. G. FEISSEL 3,524,170

SENSING SYSTEM FOR AN ARRAY OF PERSISTENT CURRENT STORAGE ELEMENTS

Filed June 23, 1967 2 Sheets-Sheet 1

Inventor:
Henri Gerard Feissel
BY Baldwin Wight Diller & Brown
Attorneys

Inventor:
Henri Gerard Feissel
BY Baldwin Wight Diller & Brown
Attorneys

United States Patent Office 3,524,170
Patented Aug. 11, 1970

3,524,170

SENSING SYSTEM FOR AN ARRAY OF PERSISTENT CURRENT STORAGE ELEMENTS

Henri Gerard Feissel, Paris, France, assignor to Societe Industrielle Bull-General Electric (Societe-Anonyme), Paris, France Filed June 23, 1967, Ser. No. 648,324
Claims priority, application France, June 30, 1966, 67,639
Int. Cl. G11c 7/00, 11/44
U.S. Cl. 340—173.1 6 Claims

ABSTRACT OF THE DISCLOSURE

In superconductor storage matrices, the threshold level of appearance of a ZERO reading signal is lower than the partial selection reading threshold level. A read operation makes use of selection currents whose maximum value is limited only by the partial selection reading threshold level, a signal representing the integral of the electromotive force induced in a sense conductor at the application of the selection currents is generated, and the signal thus formed is compared with a given reference level during a final portion of a read period in order to determine the value of the binary data element previously stored in the form of a persistent current in the selected memory element.

Figures 1, 2, 3:
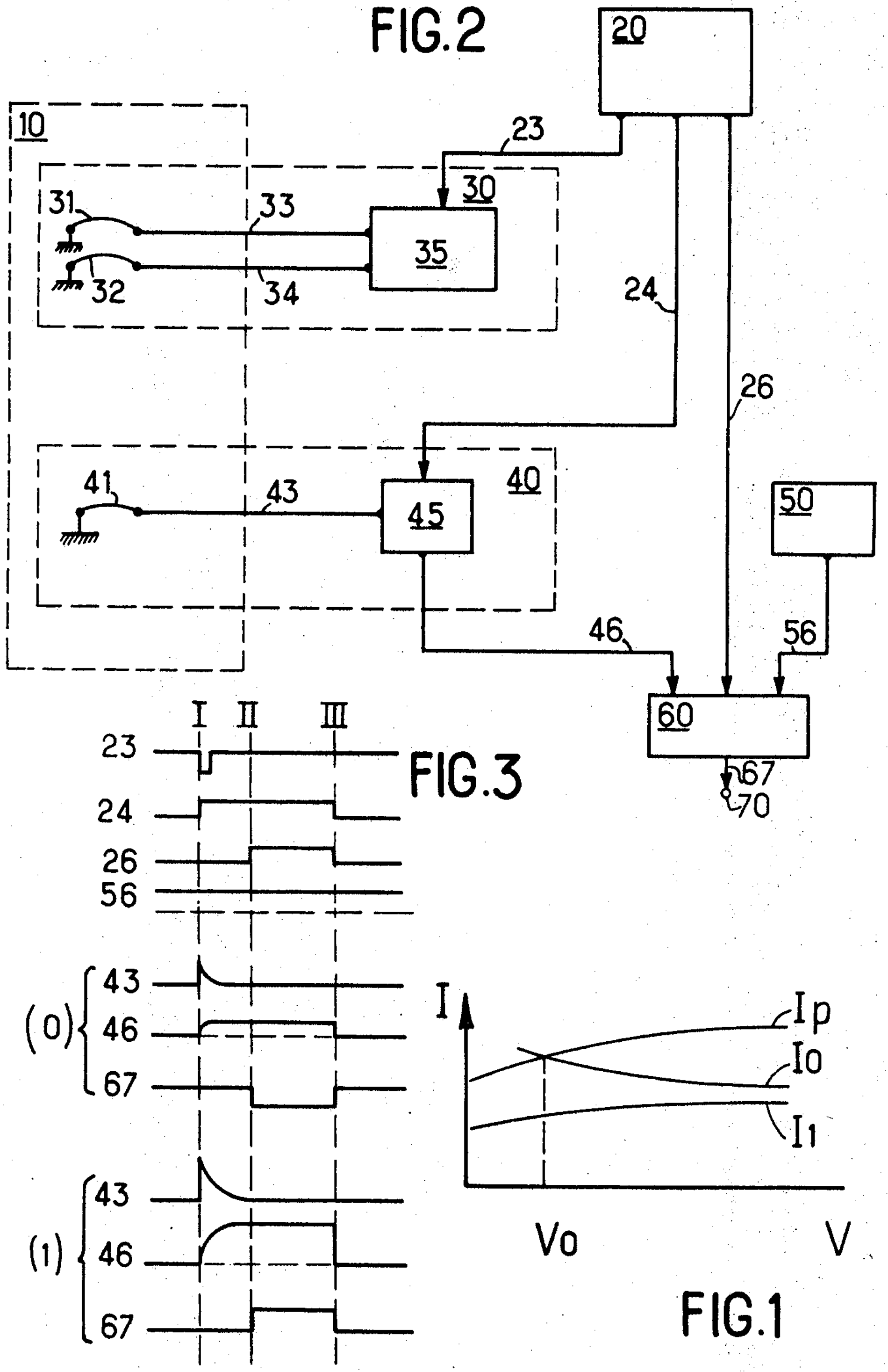

The invention concerns a method for reading out data stored in the form of persistent currents flowing through a continuous superconducting film forming the stored medium of a superconductor storage matrix.

The invention also concerns apparatus for carrying out the said method.

The reading out of a binary data element stored in a memory element in the form of persistent currents flowing through a superconducting film in a superconductor storage matrix is generally effected by the so-called return-to-zero method, i.e. by a read operation consisting in coincidentally circulating, through drive conductors associated with the memory element under consideration, drive currents of such value and such direction that persistent currents which represent the data element ZERO in regard to this memory element, circulate through tne superconducting film at the end of the read operations, regardless of whether the persistent currents circulating through this superconducting film before the read operation represented, for the memory element under consideration, the data element ZERO or the data element ONE.

Depending upon whether the persistent currents circulating through the superconducting film before the operation represented, for this memory element, the data element ONE or the data element ZERO, these persistent currents, and witn them the magnetic flux due to these currents, are modified or not modified, and an electromotive force is or is not induced in a sense conductor associated with the memory element under consideration.

Consequently, in accordance with the return-to-zero method, the reading out of the data element ONE and that of the data element ZERO result respectively in the presence and the absence of a signal at the terminals of a sense circuit. The two binary data elements may therefore, in principle, be distinguished with certainty by this method.

However, this result is obtained only if the drive or control current flowing through each of the drive conductors associated with the memory element is within certain limits.

This control current must first satisfy the usual conditions of selection by coincident currents in storage matrices, because if the selected memory element is in the state ONE before the read operation, it is necessary for the control current to exceed a certain threshold level, which may be referred to as the reading threshold level of the ONE, in order that the selected memory element may switch to the state ZERO. Likewise, it is necessary for the control current to remain below anotner threshold level, which may be referred to as the partial selection reading threshold level, in order that a memory element which is in the state ONE before the read operation may not switch to the state ZERO as a result of a partial selection operation, that is to say, as a result of tne establishment in the drive conductors associated with this memory element of only a part of the control currents, when another memory element is selected.

In superconductor storage matrices having the features indicated in the following, the control current employed for the reading out must satisfy a further condition.

These storage matirces are characterized by the fact that if a memory element is in the state ZERO, and if in the course of a reading operation relative to this memory element the control currents, although composed within the above-defined limits, exceed a certain threshold level, which may be referred to as the threshold level of appearance of a ZERO reading signal, the persistent currents representing the data element ZERO for this memory element are so modified that the magnetic flux due to these currents increases, and that an electromotive force is induced in the sense conductor associated with the memory element under consideration. Such an electromotive force cannot be readily distinguished from the electromotive force induced in the sense conductor in the case of the reading of the data element ONE. These read electromotive forces are of like polarity, and, in addition, they cannot be distinguished from one another with certainty by a comparison of their peak amplitudes because the latter are not sufficiently defined. They are, in addition, likely to vary under the effect of the disturbances caused by partial selection currents.

For these reasons, the operating reliability of storage matrices in which the above-indicated phenomena occur requires that the control current employed for carrying out the read operations relative to a memory element should be between the reading threshold level of the ONE and the threshold level of appearance of a ZERO reading signal. The range of admissible values of the control current is therefore narrower in these storage matrices than in the others. In addition, the threshold level of appearance of a ZERO reading signal depends, like the other threshold levels considered in the foregoing, upon the individual characteristics of the memory element and, in the course of the operation, upon various factors, more particularly the disturbances due to the partial selections which this memory element has undergone since the last full selection operation concerning it. A relatively small deviation of the individual characteristics of the memory element is then sufficient to make it impossible to find a value for the control currents which is suitable simultaneously for all the memory elements of the same storage matrix. Consequently, the return-to-zero reading method cannot be safely applied to superconductor storage matrices of large capacity which have the above-mentioned characteristics.

However, storage matrices of the above-indicated type have certain features which may be utilised with advantage. In these storage matrices, the difference between the reading threshold level of the ONE and the partial selection reading threshold level is greater than in other superconductor storage matrices, and these threshold levels themselves are less subject to variation during partial selections. Stores of the type under consideration therefore become advantageous if they can be made to operate with these thresholds as the lower and upper limits respectively for the control currents employed in carrying out the read operations.

The object of the invention is to render possible, despite the previously indicated unfavourable conditions, reliable operation of storage matrices of the type under consideration, and to give these storage matrices a wider field of operation than that possessed by others, during the read operations, by taking the threshold level of the ONE and the partial selection threshold level respectively as the lower and upper limits of the control currents employed for carrying out the read operations.

To this end, the method according to the invention utilises the fact that, in these storage matrices, if control currents exceeding the threshold level of appearance of a ZERO reading signal are employed, the electromotive forces induced in the sense conductor during the readout of the data element ZERO and during the readout of the data element ONE, respectively, have certain well-defined characteristics which are different from one another and by which these electromotive forces can be distinguished with certainty.

The integral function of these electromotive forces is proportional to the variation of the magnetic flux which produces these electromotive forces, and since the magnetic flux variation obtained in the readout of the data element ONE is necessarily higher than that obtained in the readout of the data element ZERO, the value taken by the integral function of the electromotive force induced is higher in the first case than in the second. The distinction between the two binary data elements, ZERO and ONE, which may be stored in a memory element, may therefore be effected with certainty by measuring this integral, which takes a distinctly different value in each case.

In addition, the method according to the invention also utilises the discovery of the fact that the disturbances due to the partial selections do not affect the value of the magnetic flux due to the persistent currents which represent the stored data, but only the distribution of these persistent currents in the superconducting film. Owing to this fact, the amplitude of the magnetic flux variations obtained in read operations relative to a memory element is not affected by any disturbances which may have been caused by the partial selections between two consecutive write and read operations relative to this memory element.

The invention concerns a method for reading-out a binary data element stored in a memory element of a superconductor storage matrix in the form of persistent currents circulating through a superconducting film forming a recording medium, the said storage matrix being such that, for each memory element, the threshold level of appearance of a ZERO reading signal, is lower than the partial selection threshold level, the said method comprising the establishment in the drive conductors associated with the said memory element of control currents of such value and direction that currents representing, in regard to this memory element, the data element ZERO circulate through the superconducting film as a result of the establishment of these control currents, regardless of whether it was the data element ZERO or ONE which was represented, for the memory element under consideration, by the persistent currents circulating through the said superconducting film before the read operation.

In accordance with the invention, such a method is characterised in that the value of the control currents is comprised between the reading threshold level of the ONE and the partial selection threshold level, this method being further characterised in that it comprises the formation of a signal representing the integral of the electromotive force which is induced, as a result of the establishment of the said control currents, in a sense conductor associated with the said memory element and the comparison of this signal with a given reference level during the final portion of a read period.

From a certain degree of dispersion of the individual characteristics, the operating reliability of the storage matrix, in the read operations carried out by the method of the invention, may become insufficient if a common reference level is used for read operations relative to different memory elements.

An improvement of the method of the invention consists in employing in each read operation a reference level depending upon the individual characteristics of the memory element concerned in the read operation in progress.

In accordance with this improvement, the formation of the reference level employed in the course of the reading operation relative to the memory element comprises, after the return-to-zero control action which has determined the circulation, through the superconducting film, of persistent currents representing the data element ZERO for the said memory element, the establishment in the drive conductors associated with the said memory element of control currents for the storing of the ONE which have the same value as those employed in the course of the said return-to-zero control action, and an opposite direction thereto, the method comprising in addition the formation of a signal representing the integral of the electromotive force which is induced in the said sense conductors as a result of the establishment of the said control currents for the storing of the ONE, the signal thus formed constituting the said reference level.

A readout device employing the method according to the invention comprises a control device, a read control circuit, a reading circuit, a reference voltage generator and a voltage-comparing device arranged to compare with one another, in each read operation controlled by the said control device, the output voltage of the sense circuit and the reference voltage generated by the reference voltage generator, and to supply at its output a characteristic signal when the output voltage of the sense circuit is higher than the reference voltage level. The control circuit of this readout device comprises drive conductors associated with the memory element under consideration and a control current generator arranged to establish in the said drive conductors, at each read operation controlled by the control device, control currents of such value and such direction that currents representing, in regard to the memory element under consideration, the data element ZERO circulate through the superconducting film at the end of the read operation regardless of whether the data element ZERO or the data element ONE was represented, for the memory element under consideration, by the persistent currents circulating through the said superconducting film before the read operation. The sense circuit of the readout device comprises the sense conductor associated with the memory element under consideration and a voltage integrating device so arranged as to apply to the comparing device, at each read operation brought about by the control device, a voltage representing the integral of the read electromotive force induced in the sense conductor as a result of the establishment of the said control currents.

Such a readout device may be more simply constructed by employing the integrating device comprised in the sense circuit to form the reference voltage and to compare with the latter the voltage representing the integral of the read electromotive force.

In addition, this readout device may be adapted to carry out the method of the invention comprising, at each read operation, the formation of a reference level depending upon the characteristics of the memory element concerned in the read operation in progress.

The reading device then comprises a control device, a read control circuit and a sense circuit. The control circuit comprises the control conductors associated with the memory element under consideration, and a control current generator arranged to set up in the said control conductors, at each read operation controlled by the control device, control currents of predetermined values and directions during a first phase, and control currents of like values and of opposite directions during a second phase of the read operation, the value and the direction of the control current set up during the first phase being such that currents representing, in regard to the memory element under consideration, the data element ZERO, circulate through the superconducting film at the end of the said first phase regardless of whether data element ZERO or the data element ONE was represented, for the memory element under consideration, by the persistent currents circulating in the said superconducting film before the read operation. The sense circuit comprises the sense conductor associated with the memory element under consideration and a voltage integrating device arranged to supply at its output, at each read operation controlled by the reading control device, a voltage representing the integral of the electromotive forces induced in the sense conductor during the first and second phases of the read operation.

Figure 4:
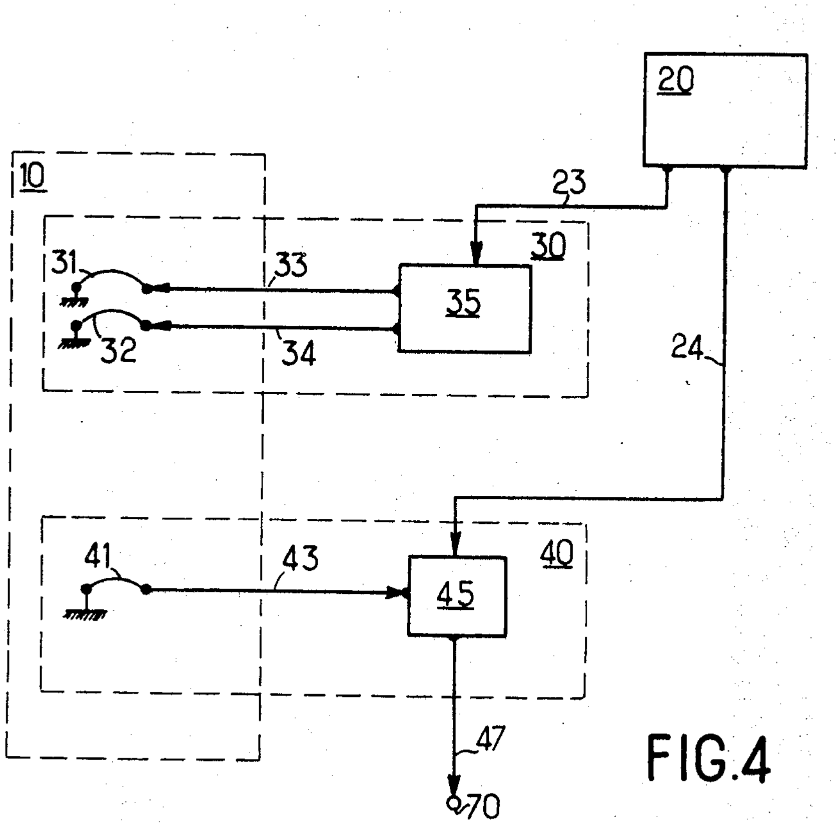
Figure 5:
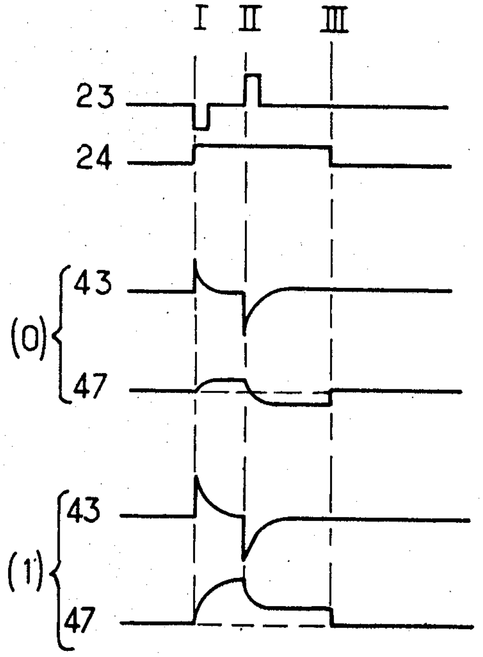

A number of embodiments of the invention will now be described, by way of example, with reference to the accompanying drawings, in which:

FIG. 1 shows the curves representing the changes of certain quantities characterising the operation of the superconductor storage matrices, as a function of a quantity expressing certain characteristics of the said storage matrices, FIG. 2 illustrates a first readout device employing the reading method according to the invention, FIG. 3 illustrates voltage waveforms appearing, in the course of a reading operation, at some determined points of the device of FIG. 2, FIG. 4 illustrates a second readout device employing the method of the invention comprising, for reading out a selected memory element, the formation of a reference level depending upon the characteristics of the said memory element, and FIG. 5 illustrates voltage waveforms appearing, in the course of the reading operation, at some determined points of the device of FIG. 4.

The storage matrices to which the invention is applicable will first be defined.

It will be observed that, depending upon the structure of superconductor storage matrices, and notably upon the microscopic structure of the superconducting film forming their storage medium, more or less large modifications may occur under the action of certain disturbances in the distribution of the persistent currents which circulate in said superconducting film.

Such a property is hereinafter referred to as the mobility characteristics.

It is possible to produce superconductor storage matrices having a more or less high mobility characteristic, for example by varying the conditions of deposition of the superconducting film, and it is found that the reading threshold level for binary ONE, the half or partial selection threshold level and the threshold level for appearance of a ZERO read signal are functions of the mobility characteristic.

FIG. 1 illustrates, as a function of this mobility characteristic, denoted by V, the curves representing the variations of these three threshold levels denoted by $I_l$ and $I_p$ and $I_0$ respectively.

It will be observed on the one hand that the interval between the thresholds, $I_l$ and $I_p$ constantly increases as V increases, that the threshold $I_0$ is lower than the threshold $I_p$ whenever V is higher than a value $V_0$, and that the interval between the thresholds $I_l$ and $I_0$ constantly decreases as V increases.

With the known readout methods, the operating reliability of superconductor storage matrices whose mobility characteristics is higher than $V_0$ requires that the drive or control currents remain between the threshold levels $I_l$ and $I_0$. The correct operating margin therefore decreases as the mobility characteristic V increases.

The readout method according to the invention is applicable to superconductor storage matrices whose mobility characteristic V is higher than $V_0$, and makes it possible to obtain reliable operation of these storage matrices with control currents exceeding the threshold level $I_0$ and capable of reaching the threshold level $I_p$, that is to say, with control currents between the thresholds $I_l$ and $I_p$. The range of admissible values of the control currents is then wider in these storage matrices than in those whose mobility characteristic is lower than $V_0$.

The readout device illustrated in FIG. 2 employs the method according to the invention. It is intended to perform a read operation relative to a memory element 10 of a superconductor storage matrix whose storage medium is a superconducting film and whose mobility characteristic is higher than $V_0$.

This readout device comprises a control device 20, a read control circuit 30, a sense circuit 40, a reference voltage generator 50, a voltage comparing device 60 connected to an output 70. Suitable links, 23, 24, 26 are provided for the application of control signals generated by the control device 20 to the elements 30, 40 and 60 of the readout device.

The read control circuit 30 comprises drive conductors 31 and 32 associated with the memory element 10 under consideration and a control current generator 35 connected to the said drive conductors by links 33 and 34 respectively. The sense circuit 40 comprises the sense conductor 41 associated with the memory element 10 under consideration and a voltage integrating device 45 connected to the sense conductor 41 by a link 43.

Suitable links 46 and 56 are provided for the application, to the comparing device 60, of the voltages appearing at the output of the integrating device 45 and at the output of the reference voltage generator 50 respectively. A suitable link 67 is provided for the application of the output signal of the comparing device 60 to the output 70.

The operation of the readout device will be apparent from FIG. 3, in which there are plotted various curves representing the changes, in the course of a read operation, of certain quantities determining the operation of the device.

In this FIG. 3, a reference numeral is placed in alignment with each curve, and each curve represents as a function of time the amplitude of the signal transmitted during a read operation through the link bearing the reference numeral, the time being plotted along the abscissae and the amplitude of the signal along the ordinates. The numerals I, II and III denote characteristic instants of the operation of the device during the read operation. Finally, the references (0) and (1) denote respectively the curves relating to the case where a ZERO was stored before the read operation, and those relating to the case where a ONE was stored before this operation.

At the instant I, under the action of a control pulse transmitted through the link 23 to the control current generator 35, the latter passes through the drive conductors 31 and 32 a current of such value and direction that currents representing the data element ZERO in regard to the memory element 10 under consideration circulate through the superconducting film at the end of the read operation, regardless of whether the data element ZERO or the data element ONE was stored before the read operation in this memory element.

Depending upon whether the data element stored before the read operation was ZERO or ONE, the reading electromotive force induced after the instant I in the sense conductor 41 and transmitted through the link 43 to the integrating device 45 takes the value indicated by one of the curves 43 in FIG. 3. It will be seen that this electromotive force has the form of a positive pulse whose peak value does not constitute a distinctive value. Regardless of the case, this electromotive force is substantially zero at the instant II.

The control device 20 supplies through the link 24 to the integrating device 45 a control signal (curve 24, FIG. 3) which enables the latter to supply at its output the integral of the electromotive force applied to its input between the instants I and III.

The integrating device 45 then supplies to the comparator 60, through the link 46, the voltage whose value is indicated in FIG. 3 by one of the curves 46.

At the instant II, this voltage reaches its maximum value, which is the integral of the read electromotive force appearing between the instants I and II.

Thereafter, between the instants II and III, this voltage remains approximately at the same maximum value because the read electromotive force remains substantially zero between these instants.

This maximum value is always low in the readout of the ZERO, and it is relatively high in the readout of the ONE.

A reference voltage (curve 56, FIG. 3) whose value is approximately one half of this relatively high value is approximately one half of this relatively high value obtained in the readout of the ONE is supplied to the comparing device 60 by the reference voltage generator 50.

The comparing device 60 then supplies through the link 67 to the output 70 of the reading device a negative or positive voltage (67, FIG. 3), depending upon whether the data element stored in the memory element 10 under consideration before the read operation was a ZERO or a ONE.

The readout device illustrated in FIG. 4 employs the method of the invention comprising, at each read operation, the formation of a reference level depending upon the characteristics of the memory element concerned in the read operation in progress. It also effects a simplification of the device illustrated in FIG. 2, in the sense that it renders possible the use of the integrating device comprised in the sense circuit for the formation of the reference voltage and for the comparison of the latter with the voltage representing the integral of the read electromotive force.

This readout device comprises a control device 20, a read control circuit 30, a sense circuit 40 connected to an output 70. Suitable links 23 and 24 are provided for applying to the elements 30 and 40 of the readout device the control signals generated by the control device 20.

The read drive circuit 30 comprises control conductors 31 and 32 associated with the memory element 10 under consideration and a control current current generator 35 connected to the said drive conductors by links 33 and 34 respectively. The sense circuit 40 comprises the sense conductor 41 associated with the memory element 10 under consideration and a voltage integrating device 45 connected to the sense conductor 41 by a link 43. A suitable connection 47 is provided for applying to the output 70 the voltage set up at the output of the integrating device 45.

The operation of the readout device will be apparent from FIG. 5, in which there are plotted various curves representing the changes, in the course of a read operation, of certain quantities determining the operation of the device.

In this FIG. 5, like references have the same meanings as in FIG. 3.

At the instant I, under the action of a first control pulse transmitted through the link 23 to the control current generator 35, the latter generates in the drive conductors 31 and 32 a current of such value and such direction that currents representing the data element ZERO in regard to the memory element 10 under consideration circulate in the superconducting film at the end of the interval between the instants I and II.

At the instant II, under the action of a second control pulse transmitted through the link 23 to the control current generator 35, the latter passes through the drive conductors 31 and 32 a current of the same value as the current which it generates at the instant I, and of opposite direction to this current, so that currents representing the data element ONE in regard to the memory element 10 under consideration circulate in the superconducing film at the end of the read operation.

Depending upon whether the memory element stored before the read operation was ZERO or ONE, the read electromotive force induced between the instants I and II in the sense conductor 41 and transmitted through the link 43 to the integrating device 45 takes the value indicated by one of the curves 43 in FIG. 5.

It will be seen that this electromotive force forms a positive pulse in the interval of time between the instants I and II and is substantially zero at the end of this interval. After the instant II, the read electromotive force has the form of a negative pulse substantially identical to the positive pulse formed by the read electromotive force between the instant I and II.

The control device 20 supplies to the integrating device 45 through the link 24 a control signal (curve 24, FIG. 5) which enables the latter to supply at its output the integral of the electromotive force applied to its input between the instants I and III.

The integrating device 45 then supplies at the output 70 of the readout device, through the link 47, the voltage whose value is indicated in FIG. 5 by one of the curves 47.

At the end of the interval between the instants I and II, this voltage reaches its maximum value, which is the value of the integral of the read electromotive force appearing in this interval.

This maximum value is always low in the readout of the ZERO, and it is relatively high in the readout of the ONE. Between the instants II and III, the voltage supplied by the integrating device 45 decreases (curves 47, FIG. 5), because the read electromotive force forms a negative pulse between these instants.

If it operated symmetrically, the integrating device 45 would supply at the end of the interval between the instants II and III a relatively high negative voltage or a relatively low voltage, depending upon whether the data element stored by the memory element 10 before the read operation was a ZERO or a ONE.

As in the device now being described, it is preferred to employ an integrating device whose gain in the presence of negative input signals is approximately one half of that which it has in the presence of positive input signals.

This is obtained by employing an integrating device having such a characteristic by construction. It could also have been obtained by employing an integrating device whose gain may be modified on command, and providing appropriate control means.

Under these conditions, as will be seen from the curves 47 in FIG. 5, the integrating device 45 of the readout device illustrated in FIG. 4 supplies through the link 47 to the output 70 of this readout device at the end of the interval between the instants II and III a negative or positive voltage, depending upon whether the data element stored in the memory element 10 before the read operation was a ZERO or a ONE.

What is claimed is:

1. A method of reading-out a binary data element stored in a memory element of a storage matrix having a data storage medium in the form of a continuous superconducting film, each memory element of said storage matrix exhibiting a threshold level for the reading of data element ZERO which is inferior to the threshold level for partial selection drive, said method comprising establishing in the drive conductors associated with said memory element, control currents of such a value and of such a direction as to store data element ZERO in said memory element, said method being characterised in that said ZERO-storing control currents have a value comprised between the threshold level for the reading of data element ONE and said threshold level for partial selection drive, said method further comprising producing a signal representing the integral of the E.M.F. which, as a consequence of the establishment of said ZERO-storing control currents in a first phase of a read period, appears in a sense conductor associated with said memory element and comparing said produced signal with a reference voltage level during the second phase of a read period.

2. A method according to claim 1 further characterised in that for the production of said reference level, said method comprises establishing in said drive conductors control currents for the storing of data element ONE during said second phase, said ONE-storing control currents having the same value as said ZERO-storing control currents and direction opposite thereto, said method further comprising producing a signal representing the integral of the E.M.F. which, as a result of the establishment of said ONE-storing control currents, appears in said sense conductor.

3. A device for reading-out a binary data element stored in a memory cell of a storage matrix having a data storage medium in the form of a continuous superconducting film, each memory cell of said storage matrix exhibiting a threshold level for the reading of data element ZERO which is inferior to the threshold level for partial selection drive, said device comprising current generator means for establishing in drive conductors associated with said memory cell, control currents of such a value and of such a direction as to store data element ZERO in said memory cell in a first phase of a read period, said device being characterized in that said ZERO-storing control currents have a value comprised between the threshold level for the reading of data element ONE and said threshold level for partial selection, said device further comprising signal integrating means for producing a signal representing the integral of the E.M.F. which, regardless of whether the data element stored was ZERO or ONE, appears with a single polarity in a sense conductor associated with said memory cell and means connected to said integrating means for comparing said produced signal with a reference level, during the second phase of said read period.

4. A device according to claim 3, characterized in that it comprises a control device adapted for establishing in said drive conductors, control currents for the storing of data element ONE at the beginning of said second phase, said ONE-storing control current having the same value as said ZERO-storing control currents and a direction opposite thereto, said signal integrating means being further adapted for producing a signal representing the integral of the E.M.F. which, as a result of the establishment of said ONE-storing control currents, appears in said sense conductor during said second phase of a read period.

5. A data readout arrangement associated with a superconductive storage matrix wherein binary data are stored in the form of persistent currents in memory cells which are coupled each with drive conductors and with a sense conductor, said arrangement comprising:

a control device adapted and connected to said drive conductors including means for supplying to said drive conductors well defined drive currents such that the read signal appearing across said sense conductor exhibits during a first phase of a read period determined amplitude and duration when the stored data is a binary "1" and reduced amplitude and duration when the stored data is a binary "0,"

a signal integrating device which operates under control of said control device and has an input connected to said sense conductor of a memory cell to receive said read signal and an output upon which appears the time integral function of said read signal, a reference voltage generator having an output, and a voltage comparator which operates under control of said control device and is connected to the output of said generator and of said integrating device, the arrangement being such that said comparator supplies during the second portion of said read period a signal of one polarity or a signal of the opposite polarity depending upon whether the data readout is "1" or "0."

6. A data readout arrangement associated with a superconductive storage matrix wherein binary data are stored in the form of persistent currents in memory cells which are coupled each with drive conductors and with a sense conductor, said arrangement comprising:

a control device adapted and connected to said drive conductors including means for supplying to said drive conductors, in a first phase of a read period, "0"-drive currents such that the read signal appearing across said sense conductor is of a first polarity and exhibits determined amplitude and duration when the stored data is a binary "1" and reduced amplitude and duration when the stored data is a binary "0," and in the second phase of the same read period, "1"-drive currents such that a second read signal appearing across said sense conductor is of a second opposite polarity, and a signal integrating device which operates under control of said control device and has an input connected to said sense conductor of a memory cell, said integrating device being such that its output delivers, during the second phase of said read period, a signal of one polarity or a signal of the opposite polarity depending upon whether the data readout is "1" or "0."

References Cited

UNITED STATES PATENTS

| | | | |
|---|---|---|---|
| 2,819,456 | 1/1958 | Stuart-Williams | 340—174 |
| 3,302,188 | 1/1967 | Miller et al. | 340—173.1 |
| 3,381,280 | 4/1968 | Hagedorn | 340—173.1 |
| 3,381,283 | 4/1968 | Gyorgy et al. | 340—173.1 X |
| 3,423,739 | 1/1969 | Scheuneman | 340—174 |

BERNARD KONICK, Primary Examiner

J. F. BREIMAYER, Assistant Examiner